(12) United States Patent
Harada

(10) Patent No.: US 8,294,933 B2
(45) Date of Patent: Oct. 23, 2012

(54) INFORMATION PROCESSING APPARATUS, INFORMATION PROCESSING METHOD, AND STORAGE MEDIUM FOR REGISTERING ATTRIBUTES FOR PRINTING

(75) Inventor: Takuto Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 12/436,348

(22) Filed: May 6, 2009

(65) Prior Publication Data

US 2009/0279135 A1 Nov. 12, 2009

(30) Foreign Application Priority Data

May 7, 2008 (JP) ................................. 2008-121504

(51) Int. Cl.
*G06F 3/12* (2006.01)
*G06F 15/00* (2006.01)
(52) U.S. Cl. ...................................... 358/1.15; 358/1.9
(58) Field of Classification Search ................. 358/1.15, 358/1.9
See application file for complete search history.

(56) References Cited

U.S. PATENT DOCUMENTS

2006/0126115 A1\* 6/2006 Morikawa et al. ........... 358/1.15
2009/0059274 A1\* 3/2009 Tomita ......................... 358/1.15

FOREIGN PATENT DOCUMENTS

JP 11-170667 6/1999

\* cited by examiner

*Primary Examiner* — Twyler Haskins
*Assistant Examiner* — Fred Guillermety
(74) *Attorney, Agent, or Firm* — Canon USA Inc. IP Division

(57) ABSTRACT

An image processing apparatus includes a receiving unit configured to receive information indicating capability of each image forming apparatus from a plurality of image forming apparatuses via a network, a capability determination unit configured to determine, by using the information received by the receiving unit, whether a number of predetermined capabilities of an image processing apparatus that have been implemented, is equal to or higher than a predetermined ratio to the number of a plurality of image processing apparatuses, and a transmission unit configured to transmit, to an image processing apparatus serving as a distribution destination, a combination of information including the predetermined capabilities of the image processing apparatus as a setting, if the capability determination unit determines that the number of the predetermined capabilities of the image processing apparatus that have been implemented, is less than the predetermined ratio.

8 Claims, 11 Drawing Sheets

FIG.4

| CAPABILITY ID | CAPABILITY | | | NO. OF UNITS | DEVICE ID |
|---|---|---|---|---|---|
| 1 | TWO-SIDED | BINDING | | 2 | A, B |
| 2 | TWO-SIDED | BINDING | V FOLDING | 1 | C |

401, 402, 201, 403, 404

| | | FREQUENCY | CAPABILITY ID | |
|---|---|---|---|---|
| | | | 1 | 2 |
| TWO-SIDED | SADDLE STITCH BINDING | 53 | 20 | 33 |
| LEFT BINDING | | 52 | 52 | |
| LEFT BINDING | V FOLDING | 77 | | 77 |
| SADDLE STITCH BINDING | | 51 | 51 | |

411, 412, 413

INFORMATION PROCESSING APPARATUS, INFORMATION PROCESSING METHOD, AND STORAGE MEDIUM FOR REGISTERING ATTRIBUTES FOR PRINTING

BACKGROUND OF THE INVENTION

1. Field of the Invention

The present invention relates to an information processing apparatus and an information processing method.

2. Description of the Related Art

Heretofore, there has been provided a system where a group attribute table is registered in every printing device as discussed in Japanese Patent Application Laid-Open No. 11-170667.

In the conventional technique described above, however, the group attribute table is only used by the device in which the group attribute table is registered. When a device of a similar configuration is newly installed, a group attribute table needs to be set again specially to the newly installed device, which has been a burden for the users.

Further, a general user can individually register a group attribute table in a device. In this case, it is difficult to assess the most effective group attribute table to be used in a particular department, and is difficult to share effective settings among different divisions.

SUMMARY OF THE INVENTION

According to an aspect of the present invention, an image processing apparatus includes a receiving unit configured to receive information indicating capability of each image forming apparatus from a plurality of image forming apparatuses via a network, a capability determination unit configured to determine, by using the information received by the receiving unit, whether a number of predetermined capabilities of an image processing apparatus that have been implemented, is equal to or higher than a predetermined ratio to the number of a plurality of image processing apparatuses, and a transmission unit configured to transmit, to an image processing apparatus serving as a distribution destination, a combination of information including the predetermined capabilities of the image processing apparatus as a setting if the capability determination unit determines that the number of the predetermined capabilities of the image processing apparatus that have been implemented, is less than the predetermined ratio.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating an example of a data structure stored on a memory.

DETAILED DESCRIPTION OF THE EMBODIMENTS

Embodiments of the invention will be described in detail below with reference to the drawings.

Figure 1:
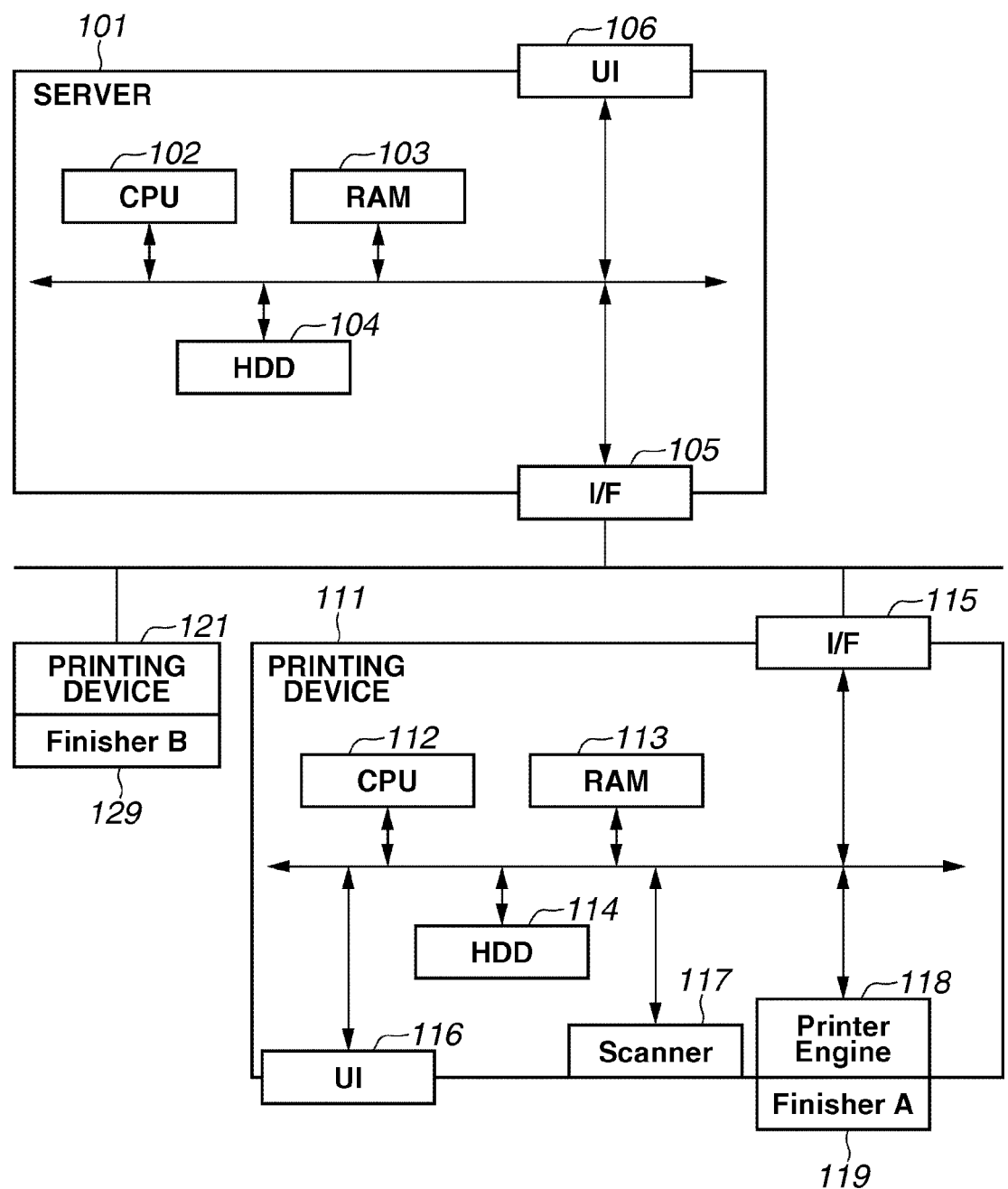
FIG. 1 is a diagram illustrating an example of a hardware configuration of a system.

FIG. 1 is a diagram illustrating an example of the hardware configuration of the system.

A server 101 is an example of an information processing apparatus (computer). All of the software of the server 101, which will be described below, is operated on a central processing unit (CPU) 102. A random access memory (RAM) 103 is provided as a data storage and used for the operation of the software (program) on the CPU 102. A hard disk drive (HDD) 104 stores the software. An interface (I/F) 105 is provided for communication with printing devices. A user operates the server 101 using a user interface (UI) 106. Further, the UI 106 displays results of the operation of the software.

A printing device 111 is an example of an image processing apparatus. All of the software of the printing device 111, which will be described below, is operated by a CPU 112. A RAM 113 is provided as a data storage and also used during the operation of the software (program) by the CPU 112. An HDD 114 stores the software. An interface (I/F) 115 is provided for communication with printing devices. A user operates the printing device 111 using a UI 116. The UI 116 displays results of the operation of the software. The printing device 111 further includes a scanner 117, a printer engine 118, and a finisher 119.

A printing device 121 is another printing device as an example of the image processing apparatus. The hardware configuration in this exemplary embodiment is similar to that of the printing device 111. The printing device 121 is provided with a finisher 129.

As illustrated in FIG. 1, the server 101 is communicably connected to the printing device 111 and the printing device 121.

Figure 2:
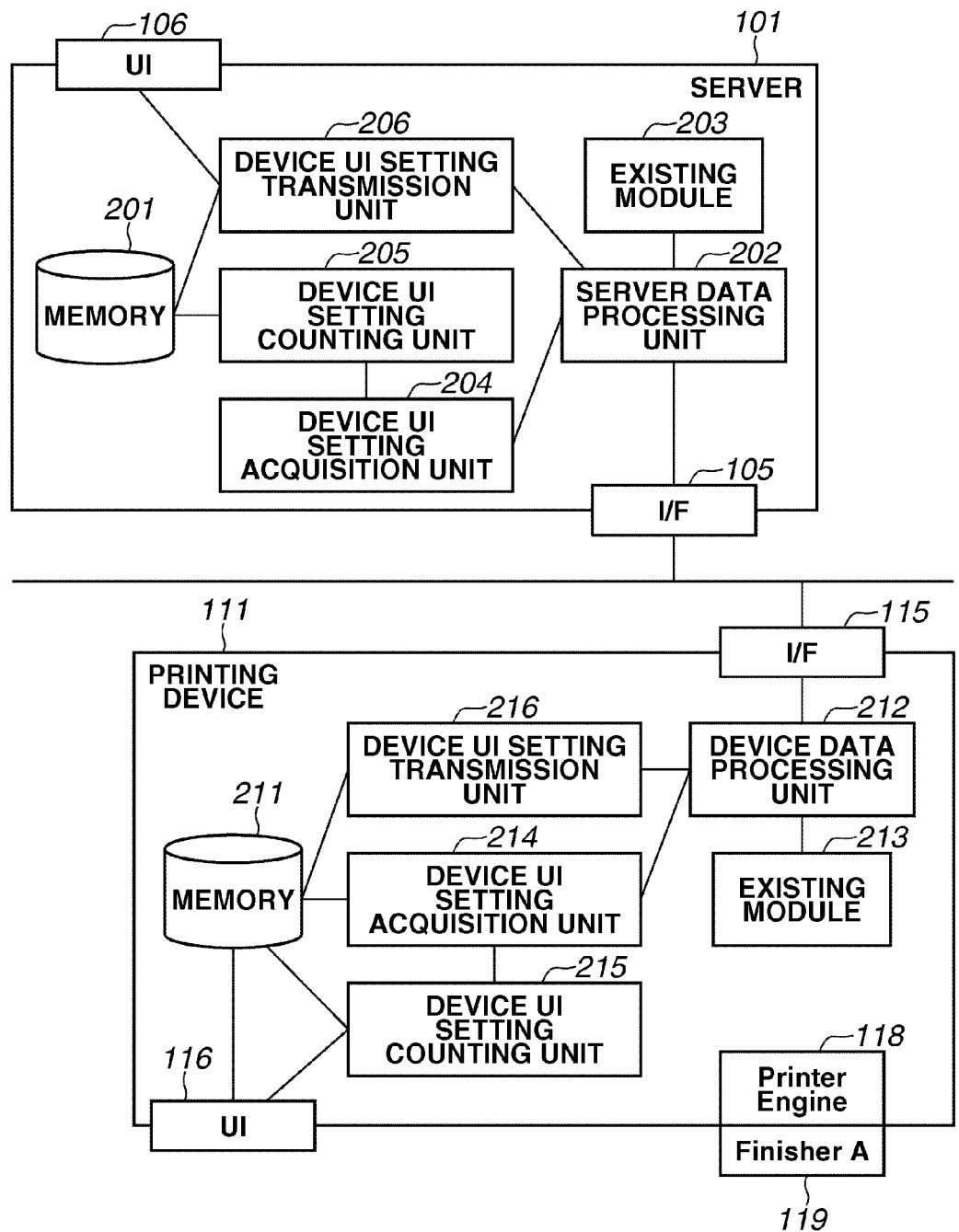
FIG. 2 is a diagram illustrating an example of software module configuration of the system.

FIG. 2 is a diagram illustrating an example of the software module configuration of the system. The memory 201 is formed by the RAM 103 or the HDD 104. A server data processing unit 202 is configured to sort out data received by the I/F 105 into data under protocol of this exemplary embodiment or data under an existing protocol. A module 203 is an existing module. A device UI setting acquisition unit 204 acquires the UI settings performed in the printing device, the group attribute tables (311, 312 in FIG. 3 to be described below) as exemplary group attribute data, and the usage frequencies (313 in FIG. 3) of the group attribute tables.

A device UI setting counting unit 205 counts the UI settings, the group attribute tables (311, 312 in FIG. 3 to be described below), and usage frequencies (313 in FIG. 3) of the group attribute tables, that are acquired by the device UI setting acquisition unit 204 from the printing device 111 or the printing device 121 on the network. Count results obtained by the device UI setting counting unit 205 are stored in the memory 201 in a format as illustrated in FIG. 4 as described below. A server UI setting transmission unit 206 transmits appropriate UI settings from those items in FIG. 4 as described below. Programs 202 to 206 operate on the CPU 102.

A memory 211 is formed by the RAM 113 or the HDD 114. A device data processing unit 212 is configured to sort out data received by the I/F 115 into data under a protocol of this exemplary embodiment or data under an existing protocol. A module 213 is an existing module. A device UI setting transmission unit 214 transmits the UI settings in the printing device, the group attribute tables (311, 312 in FIG. 3 to be described below), and the usage frequency (313 in FIG. 3 to be described below) of the group attribute tables.

A device UI setting counting unit 215 is configured to count the UI settings in the printing device, and the group attribute tables (311, 312 in FIG. 3 to be described below), and the usage frequency of the group attribute tables. A server UI setting acquisition unit 216 acquires appropriate UI settings from the server 101. Programs 212 to 216 operate on the CPU 112.

Figure 3:
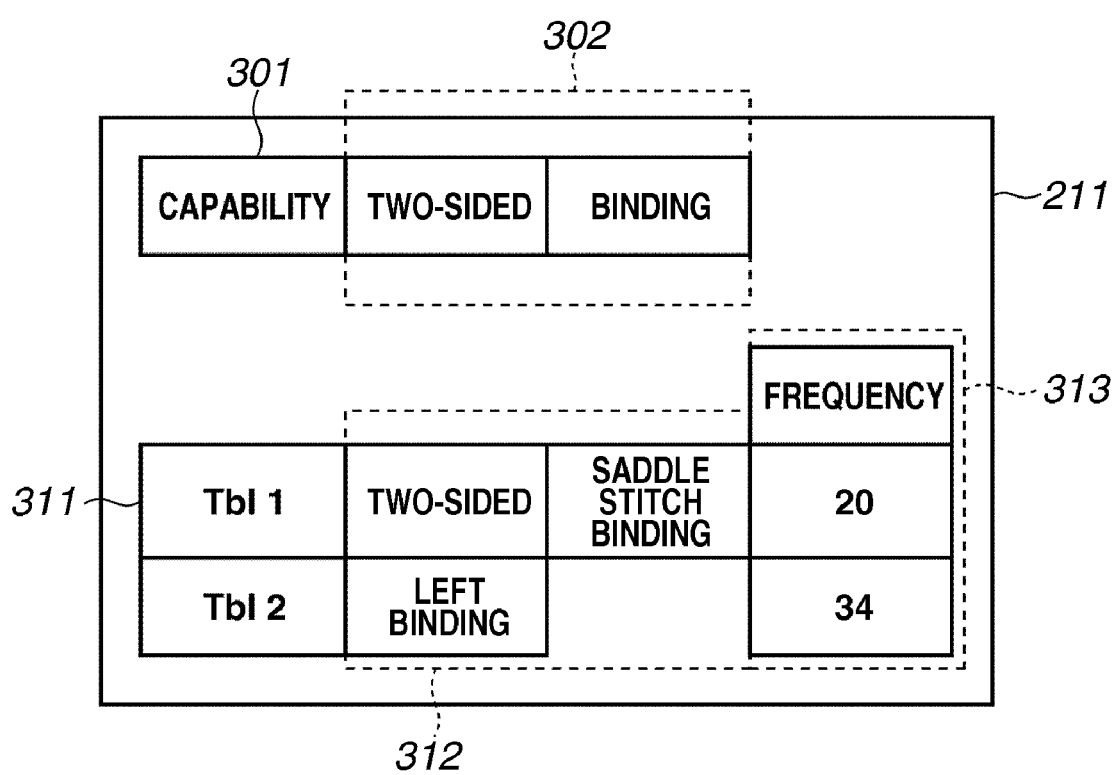
FIG. 3 is a diagram illustrating an example of a data structure stored on a memory.

FIG. 3 is a diagram illustrating an example of a data structure stored on the memory 211. A capability region 301 is provided as a region to store the functions that the printing device possesses. More specifically, the capability region 301 stores capabilities of a connected device, such as a finisher, in an area 302. FIG. 3 indicates capabilities of "two-sided printing" and "binding". A group attribute table 311 includes two tables "Tbl 1" and "Tbl 2" as illustrated in FIG. 3. Information 312 is information set in the group attribute tables, more specifically, combination information about combinations of used capabilities. In FIG. 3, "two-sided printing" and "saddle stitch binding" are set in "Tbl 1" and "left binding" is set in "Tbl 2". A column 313 is used to store frequencies (usage frequencies) that the group attribute tables Tbl 1, Tbl 2 are used. FIG. 3 indicates that "Tbl 1" was used 20 times and "Tbl 2" was used 34 times.

FIG. 4 is a diagram (part 1) illustrating an example of a data structure stored on the memory 201. ID 401 identifies capabilities possessed by printing devices on the network. Column 402 indicates detailed combinations of capabilities in an ID column 401. A column 403 indicates numbers of printing devices with the same capabilities existing on the network. An ID column 404 indicates the printing devices.

Capability ID "1" is assigned to functions, "two-sided printing" and "binding". This means that there are "2" printing devices with these capabilities on the network and that the IDs of the printing devices are A and B. On the other hand, capability ID "2" is assigned to functions, "two-sided printing", "binding" and "V folding". Therefore, there is "1" printing device with these capabilities on the network and its device ID is C.

A table 411 is a group attribute table (a combination of information about capability combinations) set in the printing devices on the network. A column 412 indicates the usage frequencies of respective tables in the group attribute tables. A column 413 indicates the usage frequencies of respective capability IDs shown in a column 401. In the printing devices of FIG. 4 on the network, a group attribute with "two-sided printing" and "saddle stitch binding" set in a group attribute table has been used "53" times, in other words, "20" times in the printing devices with capability ID "1" and "33" times in the printing device with capability ID "2".

A group attribute with "left binding" set in the group attribute table has been used "52" times, in other words, used "52" times in the printing devices with capability ID "1". A group attribute table with "left binding" and "V folding" set in a group attribute table has been used "77" times, to be more specific, used "77" times in the printing device with capability ID "2". A group attribute with "saddle stitch binding" set in a group attribute table has been used "51" times, more specifically, used "51" times in the printing devices with capability ID "1".

Figure 5:
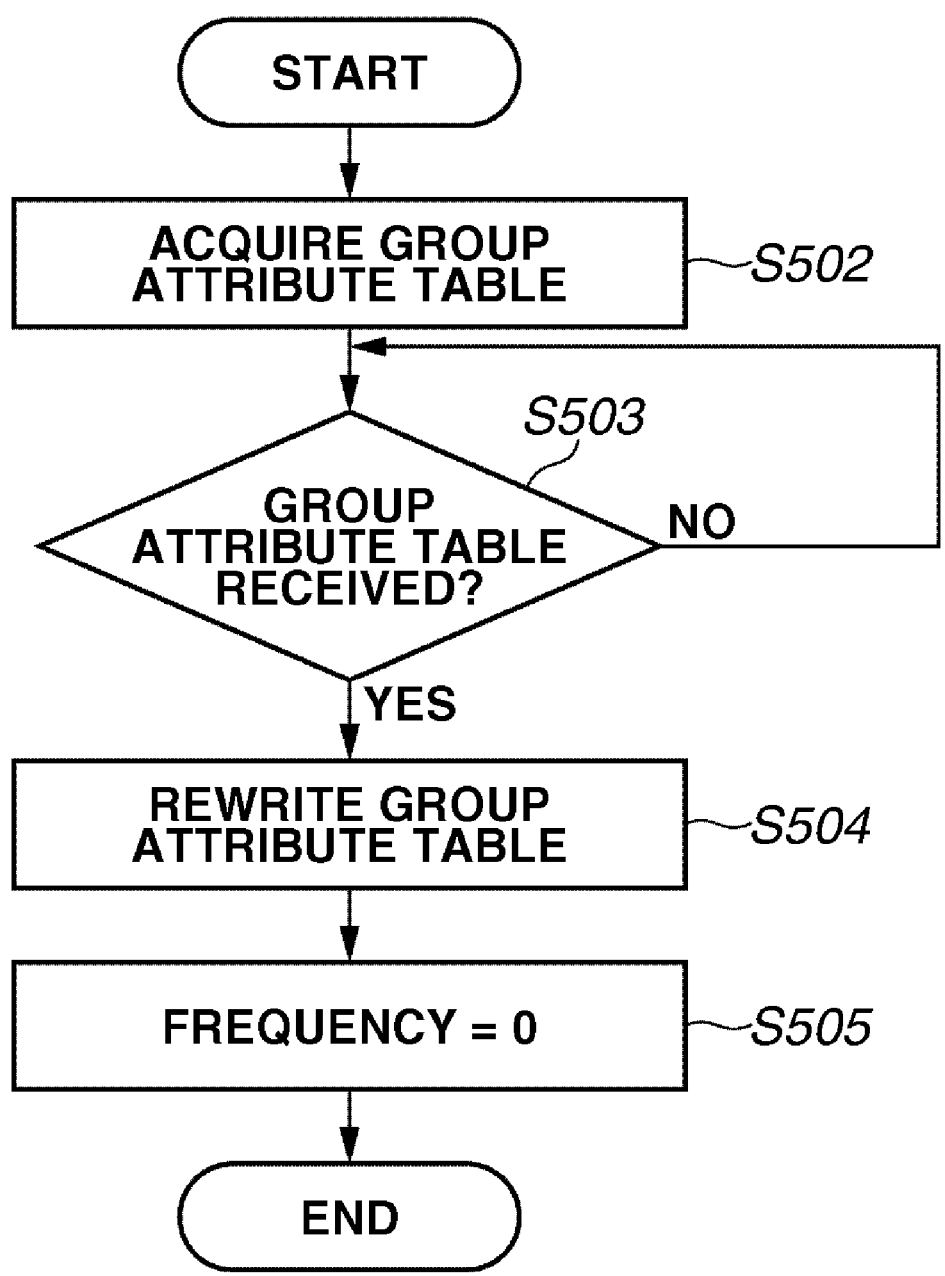
FIG. 5 is a flowchart illustrating an example of a process by which a printing device acquires a group attribute table from a server.

FIG. 5 is a flowchart illustrating an example of a process by which the printing device 111 or 121 acquires a group attribute table 312 from the server 101. The server UI setting acquisition unit 216 of the printing device 111 or 121 acquires the function 302 of the printing device that exists in the memory 211, and asks the device data processing unit 212 to acquire group attribute tables in step S502. The server UI setting acquisition unit 216 may start the process in step S502 when a button provided on the UI 116 is pressed, or may start the process in step S502 at predetermined time intervals.

The device data processing unit 212, via I/F 115, supplies the server 101 with a request to acquire group attribute tables, including the functions of the printing device in the column 302, and receives group attribute tables in step S503. The device data processing unit 212 transfers the group attribute tables 312 received in step S503 to the server UI setting acquisition unit 216. The server UI setting acquisition unit 216 overwrites reception results on the group attribute tables 312 on the memory 211 in step S504. At the time, the server UI setting acquisition unit 216 sets the usage frequencies 313 to 0 in step S505.

Figure 6:
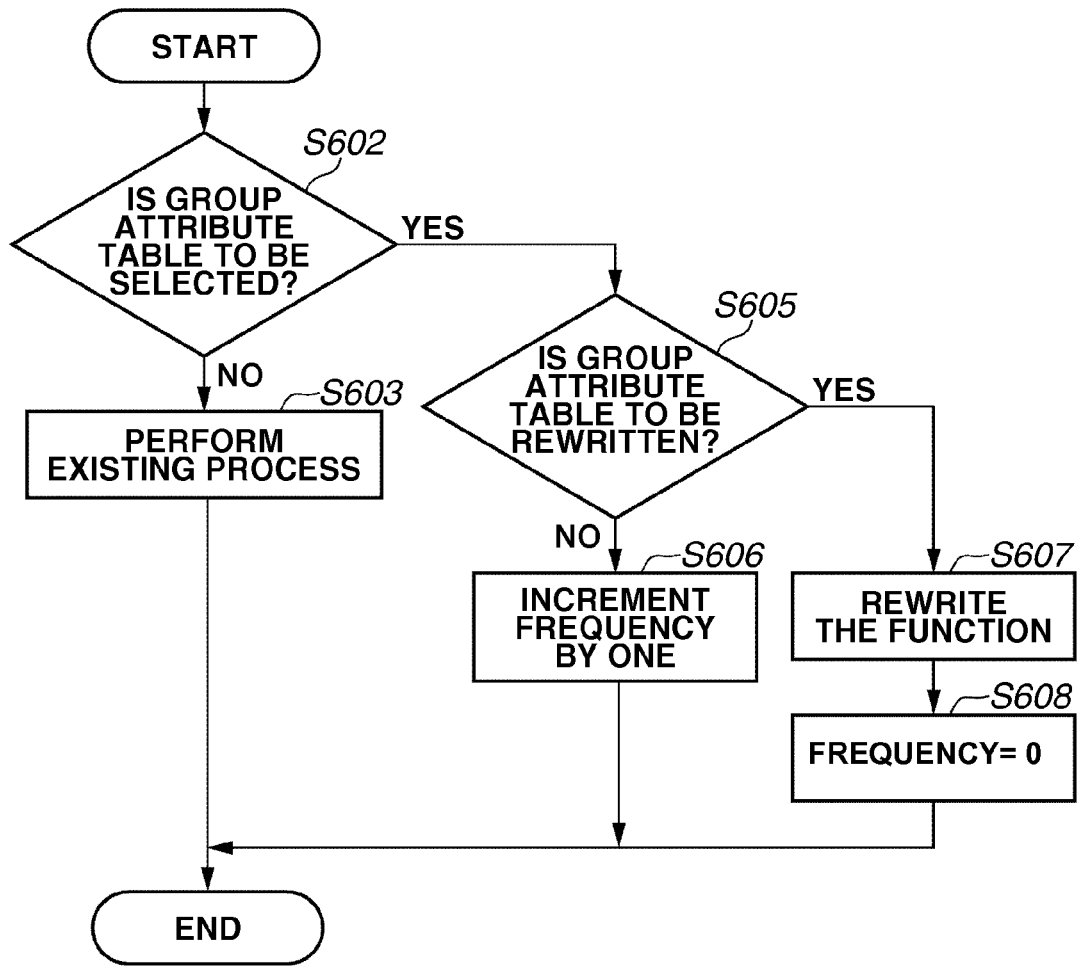
FIG. 6 is a flowchart illustrating an example of a process of generating a group attribute table and group attribute table usage frequencies on the printing device side.

FIG. 6 is a flowchart illustrating an example of a process of generating a group attribute tables (311, 312) and usage frequencies 313 of the group attribute tables. The device UI setting acquisition 215 determines if the operation in the UI 116 is related to the group attribute tables in step S602. If it is determined that the operation is not related to group attribute tables, the device UI setting acquisition 215 performs an existing process in step S603. If it is determined that the operation in the UI 116 is related to group attribute tables, the device UI setting counting unit 215 determines whether the group attribute tables is to be rewritten in step S605.

If the group attribute table is not to be rewritten (i.e., the current group attribute table is to be used), the device UI setting counting unit 215 increments the frequency in the usage frequency 313 by one in step S606. If it is determined in step S605 that the group attribute tables is to be rewritten, the device UI setting accounting unit 215 rewrites the relevant regions in the capability information column 312 in step S607, and sets the relevant regions in the usage frequency column 313 to 0 in step S608.

Figure 7:
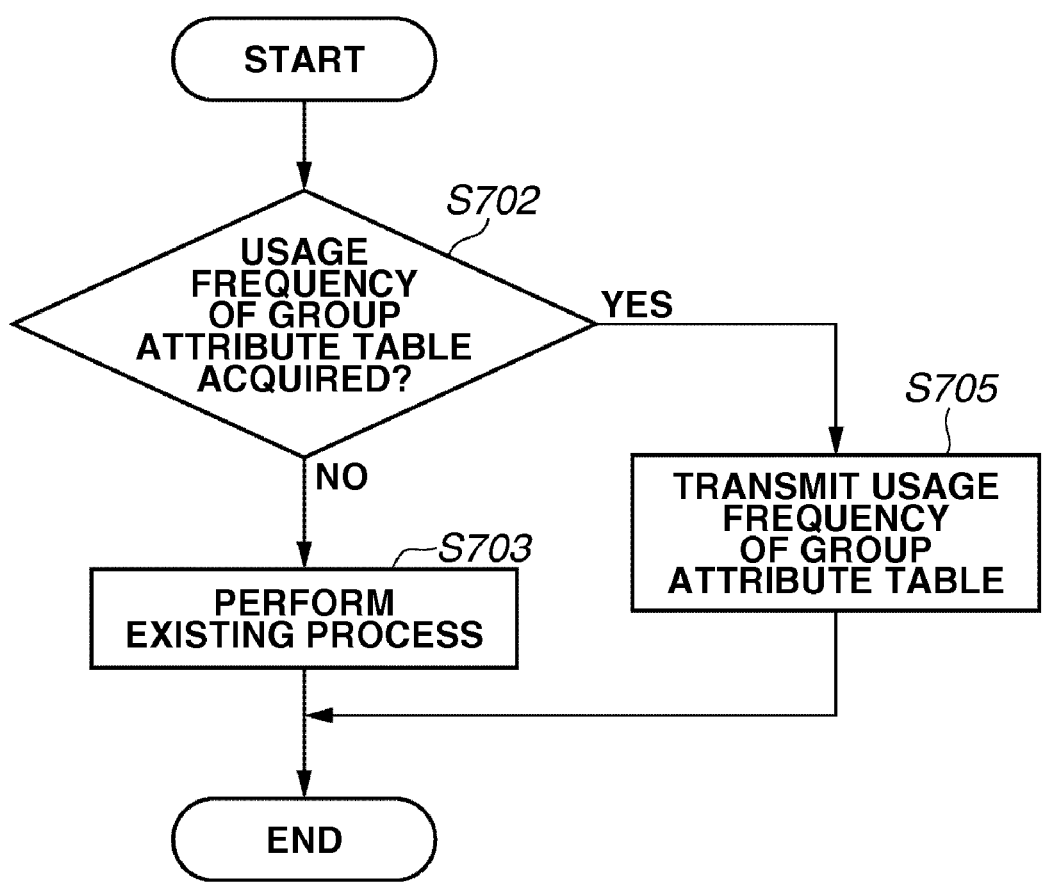
FIG. 7 is a flowchart showing an example in which the printing device processes a request, sent from the server, for group attribute tables and a group attribute table usage frequency.

FIG. 7 is a flowchart illustrating an example of a process by which the printing device 111 or 121 processes a request from the server 101 for group attribute tables (311, 312) and a usage frequency of the group attribute tables.

The device data processing unit 212 determines data transmitted from the server 101 to the printing device 111 or 121 in step S702. If it is determined in step S702 that received data was supplied not in response to a request for group attribute tables and a usage frequency of the group attribute tables, the device data processing unit 212 performs an existing process in step S703. If it is determined in step S702 that received data was supplied in response to a request for group attribute tables and a usage frequency of the group attribute tables, the device data processing unit 212 acquires information 311, 312, and 313 from the memory 211 via the device UI setting transmission unit 214. The device data processing unit 212 supplies the server 101 with information 311, 312, and 313, attaching printing device ID thereto in step S705.

Figure 8:
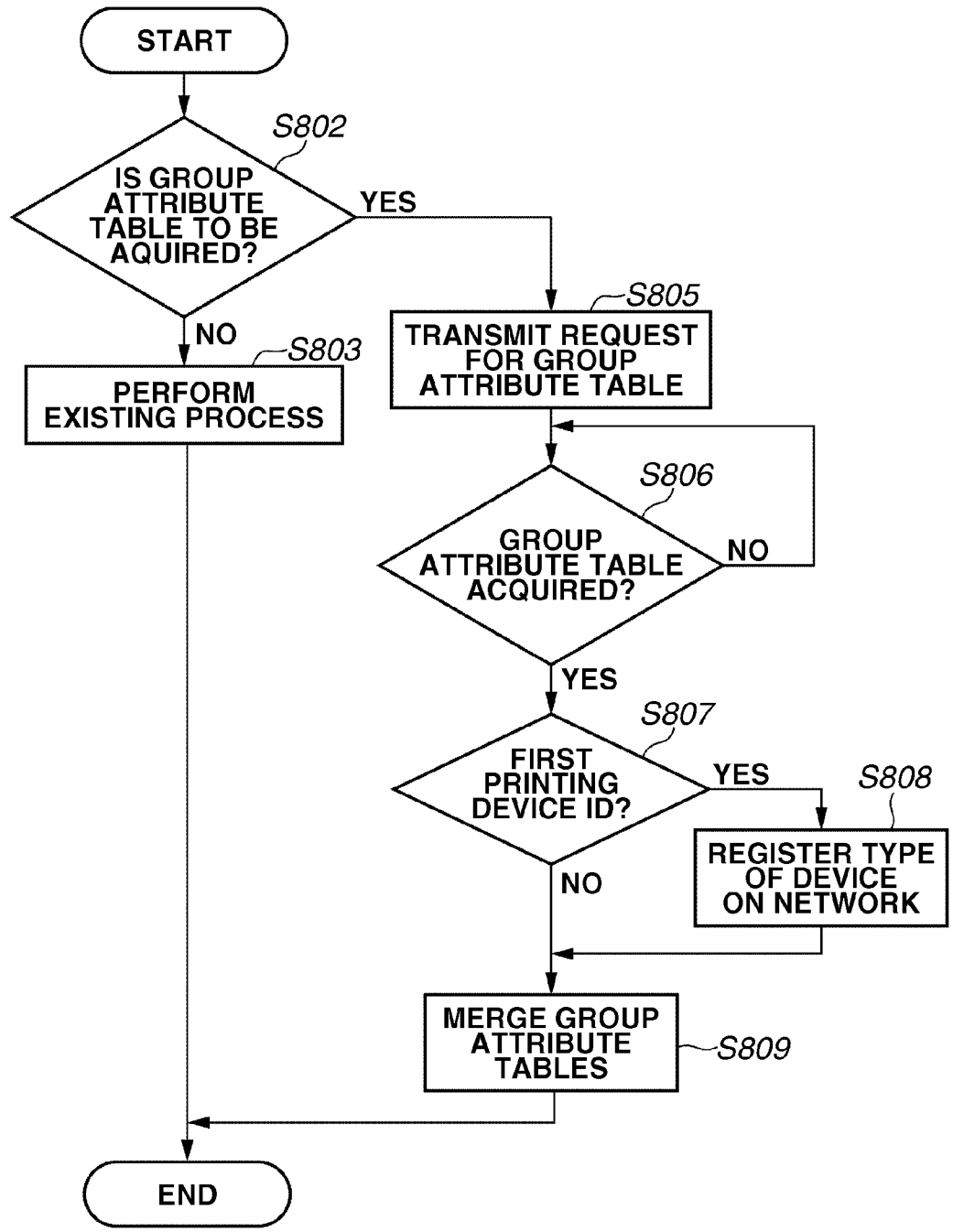
FIG. 8 is a flowchart illustrating a process by which the server acquires group attribute tables and a usage frequency of the group attribute table from the printing device.

FIG. 8 is a flowchart illustrating a process by which the server 101 acquires group attribute tables (311, 312) and a usage frequencies 313 of the group attribute tables from the printing device 111 or 121.

The device UI setting acquisition unit 204 determines whether to acquire group attribute tables and usage frequencies of the group attribute tables based on whether it is a predetermined time, for example, in step S802. If the device UI setting acquisition unit 204 determines that it should acquire group attribute tables and usage frequencies of the group attribute tables, the process proceeds to step S805. If the device UI setting acquisition unit 204 determines that it should not acquire group attribute tables and usage frequencies of the group attribute tables, the process advances to step S803.

The device UI setting acquisition unit 204 may start the process in step S802 when a button on the UI 106 is pressed, or may start the process in step S802 at predetermined time intervals.

In step S803, the device UI setting acquisition unit 204 executes an existing process. On the other hand, in step S805, the device UI setting acquisition unit 204 transmits a request to acquire group attribute tables and usage frequencies of the group attribute tables to the printing device 111 or 121 via the server data processing unit 202 and the I/F 105.

When receiving the usage frequency of the group attribute tables in step S806, the server data processing unit 202 transmits the usage frequency to the device UI setting acquisition unit 204. The device UI setting acquisition unit 204 passes received data to the device UI setting counting unit 205, which in turn analyses the received data. If the data is about a printing device, the ID of which has yet to be registered in the device ID column 404 (YES in step S807), the device UI setting counting unit 205 updates the information 401, 402, 403, and 404 in step S808. The device UI setting accounting unit 205 merges received group attribute tables and usage frequencies of the group attribute tables with information in the areas 411, 412, and 413 in step S809.

Figure 9:
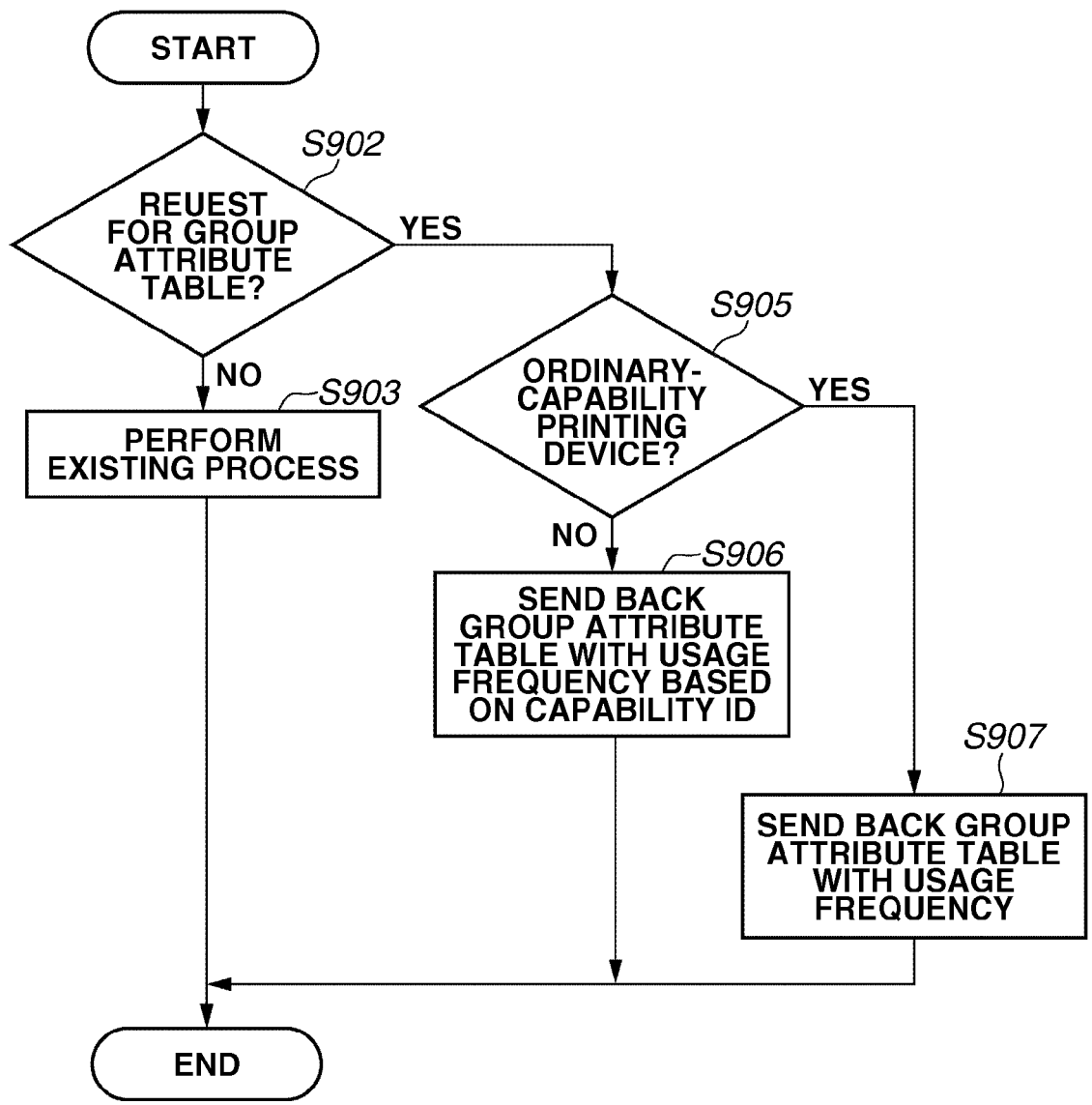
FIG. 9 is a flowchart illustrating an example of a process when the server receives a request for the group attribute table from the printing device.

FIG. 9 is a flowchart illustrating an example of a process when the server 101 has received a request for group attribute tables from the printing device 111 or 121. In step S902, the device data processing unit 212 determines based on received data whether received data is a request for group attribute tables (to determine data reception). If the data is a request for group attribute tables, the device data processing unit 212 executes an existing process in step S903. If it is determined in step S902 that a request for group attribute tables is received, the device data processing unit 212 transmits received data to the server UI setting transmission unit 206.

The server UI setting transmission unit 206 searches the capability 402 by using as a key the printing device's function 302, which is capability information included in the received data. In step S905, the server UI setting transmission unit 206 determines from the number of printing devices 403 whether the request for group attribute tables came from a printing device of an ordinary device configuration present on the network or from a printing device of a minority device configuration (an example of capability determination).

The server UI setting transmission unit 206 may determine if printing devices requested by the source of a request are of an ordinary device configuration or of a minority device configuration by seeing whether the devices called for by the requester belong to 70% or more of a total number of the devices in the whole system. The above-mentioned 70% of the devices may be set via the UI 106 or the I/F 105.

In other words, whether a printing device has an ordinary device configuration or not is determined by whether the device configuration (a composition of capabilities) of the printing device belongs to a group of the device configuration shared by more than a certain percentage of the total number of printing devices existing in a predetermined range of the network or in a certain corporate division. For instance, a printing device with a capability of saddle stitch binding is determined to be ordinary if this capability is shared by more than 70 percent of the total number of printing devices.

If it is determined in step S905 that a printing device belongs to a minority device configuration, the server UI setting transmission unit 206 acquires capability IDs from the column 401 corresponding to the functions 302 and also acquires group attribute tables of high usage frequency out of a plurality of the same capability IDs in the capability ID 413 as many as the number of tables of the table column 311 from the table 411. The number of tables here may be included in a request for group attribute tables. The server UI setting transmission unit 206 transmits group attribute tables to the printing device as the source of a request via the server data processing unit 202 and the I/F 105 in step S906.

On the other hand, if it is determined in step S905 that the printing device belongs to an ordinary device configuration, the server UI setting transmission unit 206 acquires capability IDs in the column 401 corresponding to the functions in the column 302, and selects a group attribute table with highest usage frequency (or at frequency equal to or higher than a predetermined value) from the table 411. The server UI setting transmission unit 206 determines whether the capability corresponding to the capability ID 401 is included in the capability ID 413 in the selected group attribute table 411, and if this capability is determined to be included, the relevant group attribute table is handled as a group attribute table as a transmission target.

On the other hand, if it is determined that this capability is not included, the server UI setting transmission unit 206 repeats to execute a process such as searching group attribute tables 411 for a group attribute table with next highest usage frequency (or at a usage frequency higher than a predetermined value). And, the server UI setting transmission unit 206 acquires group attribute tables as many as the number of tables in the group attribute table 311, and transmits group attribute tables to the printing device that is the source of a send request, via the server data processing unit 202 and the I/F 105 in step S907.

According to this embodiment, each printing device counts the usage frequencies (usage frequency information) of group attribute tables. The server 101 periodically collects usage frequencies from the printing devices, and classifies data according to different function configurations of the printing devices, and stores the data into the memory. When an inquiry is made from a printing device, the server 101 supplies the printing device with a group attribute table showing the highest usage frequency (or at frequency equal to or higher than a predetermined value) in the device configuration of the printing device. The printing device has the supplied group attribute table registered in memory.

Relatively general-purpose functions are more likely to be used in every printing device, and their usage frequency tends to be high. Therefore, when a printing device with a special function (capability) is used, the server 101 transmits a group attribute table prioritizing the special function (capability), to the printing device. On the other hand, when a printing device has an ordinary function (capability), priority is placed on usage frequency, and a group attribute table with highest usage frequency (or usage frequency higher than a predetermined value) is supplied to the printing device. In so doing, a group attribute table which is used with high frequency in a certain division can be appropriately shared with other divisions. Moreover, even in a printing device to which a group attribute table is introduced for the first time, settings effective in the divisions where the existing printing device is installed, can be implemented automatically and on solid grounds in the new printing device.

In the above embodiment, the server 101 and the printing devices 111, 121 physically connected to the network have been described as the target devices. However, it is possible to implement the above embodiment among the server and the printing devices on a logical network, in which, for example, from the UI 106 of the server 101, a user specifies printing devices with which to exchange group attribute tables and configures a logical network with the specified printing devices. In the case of this embodiment, an example of the information processing apparatus (computer) is a printing device.

Figure 10:
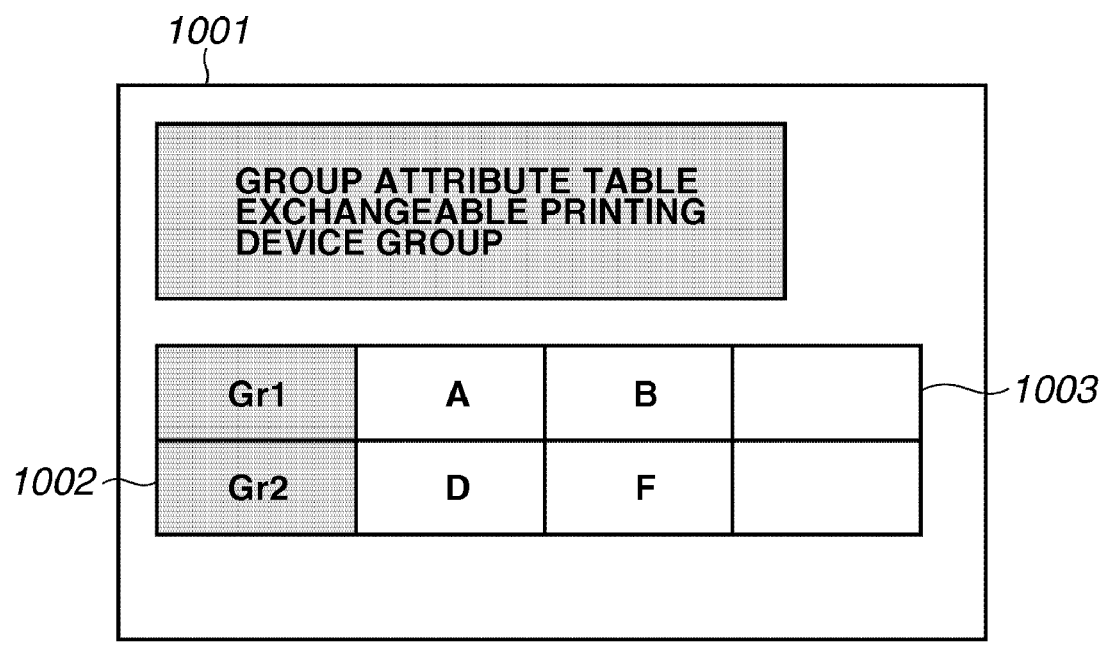
FIG. 10 is a diagram illustrating an example of a user interface (UI).
Figure 11:
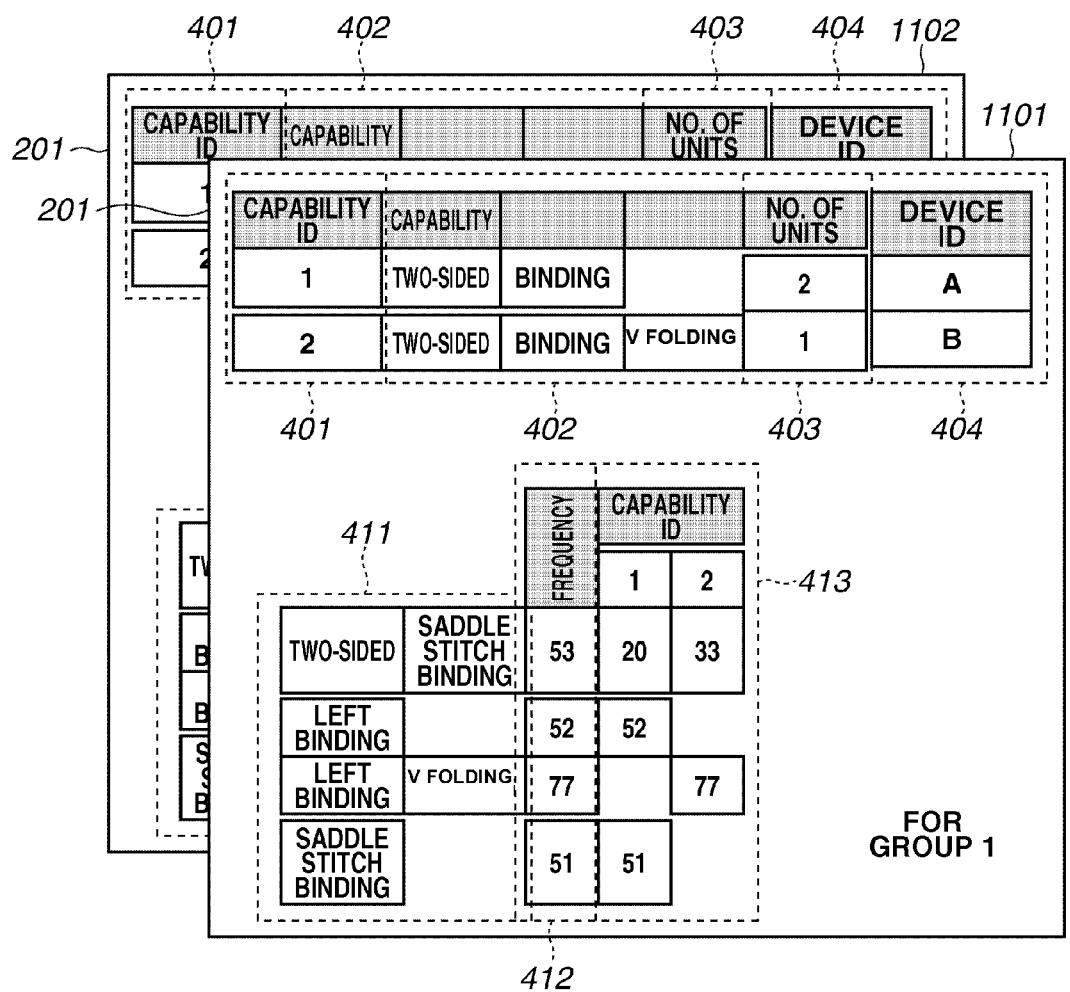
FIG. 11 shows diagrams illustrating examples of the data structure stored on the memory.

FIG. 10 is a diagram illustrating an example of the UI. FIG. 11 is a diagram (part 2) illustrating an example of a data structure stored on the memory 201.

The server 101 displays the UI 1001 to build a logical network on the HDD 104. The user, by operating the UI, specifies (sets) a group in a frame 1002, and the printing devices existing in the group input to the frame 1002, in a frame 1003. The server 101 generates information in the memory 201 described referring to FIG. 4 in respective groups based on information set in the UI 1001. (1101, 1102).

In the previously mentioned exemplary embodiment, the device UI setting counting unit 205 and the server UI setting transmission unit 206 deal with one part of information illustrated in FIG. 4. In this embodiment, a process that refers to the groups 1101, 1102 is added.

According to this exemplary embodiment, even when the settings are related to the capabilities with low usage frequencies, if a number of the mounted capabilities is equal to or lower than predetermined values, they can be presented to the user without leaving their settings hidden.

The present invention can be implemented as follows. A storage medium (or a recording medium) that stores program code of software configured to carry out the functions of the described exemplary embodiment is supplied to a system or a device. Then, the present invention can be realized by the central processing unit (the CPU or MPU) of the system or the device that reads and executes the program code stored in the storage medium. In this case, the program code itself which is read from the storage medium realizes the functions of the above-described embodiment, and the storage medium containing the program code constitutes the present invention.

By executing the program code that is read by the central processing unit of the system or the device, according to commands of the program code, the operating system (OS) running on the system or the device performs part or all of actual processing. By this processing, the function of the exemplary embodiment as described above is realized.

In addition, the program code read from the storage medium is written in the memory provided in a function expansion loaded in the computer or in a function expansion unit connected to the computer. Then, according to commands of the program code, the CPU in the function expansion board or in the function expansion unit carries out part or all of actual processing, and by this processing, the function of the exemplary embodiment can be achieved.

When the present invention is applied to the storage medium, a program code corresponding to the above mentioned flow chart is stored in the storage medium (computer-readable storage medium).

According to the above exemplary embodiments, effective group attribute tables can be provided to an image processing apparatus existing on a network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-121504 filed May 7, 2008, which is hereby incorporated by reference herein in its entirety.

What is claimed is:

1. An information processing apparatus, comprising:
a receiving unit configured to receive information indicating capability of each image forming apparatus from a plurality of image forming apparatuses via a network;
a capability determination unit configured to determine, by using the information received by the receiving unit, whether a number of predetermined capabilities of an image processing apparatus that have been implemented, is equal to or higher than a predetermined ratio to the number of a plurality of image processing apparatuses; and
a transmission unit configured to select a combination of information whose usage frequency is equal to or higher than a predetermined number, out of the plurality of combinations of information including the predetermined capabilities as a setting and transmit the selected combination of information to an image processing apparatus serving as a distribution destination, if the capability determination unit determines that the number of the predetermined capabilities of the image processing apparatus that have been implemented, is less than the predetermined ratio.

2. The information processing apparatus according to claim 1, wherein, if the capability determination unit determines that the number of the predetermined capabilities that have been implemented, is equal to or higher than the predetermined ratio, the transmission unit selects a combination of information whose usage frequency is equal to or higher than a predetermined number, out of a combination of information including the predetermined capabilities as a setting and a combination of information not including the predetermined capabilities as a setting, and transmits the combination of information to the image processing apparatus serving as a distribution destination.

3. The information processing apparatus according to claim 1, wherein the usage frequency is extracted from the information received by the receiving unit.

4. An information processing method for use in an information processing apparatus, comprising:
receiving information indicating capability of each image forming apparatus from a plurality of image forming apparatuses via a network;
determining, by using information received, whether a number of predetermined capabilities of an image processing apparatus that have been implemented, is equal to or higher than a predetermined ratio to the number of a plurality of image processing apparatuses;
selecting a combination of information whose usage frequency is equal to or higher than a predetermined number, out of the plurality of combinations of information including the predetermined capabilities as a setting; and transmitting, the selected combination of information to an image processing apparatus serving as a distribution destination, if it is determined that the number of the predetermined capabilities of the image processing apparatus that have been implemented, is less than the predetermined ratio.

5. The information processing method according to claim 4, further comprising:

selecting a combination of information whose usage frequency is equal to or higher than a predetermined number, out of a plurality of combinations of information including the predetermined capabilities as a setting, if it is determined that the number of the predetermined capabilities that have been implemented, is less than the predetermined ratio; and transmitting the combination of information to the image processing apparatus serving as the distribution destination.

6. The information processing method according to claim 5, wherein the usage frequency is extracted from information received.

7. The information processing method according to claim 4, further comprising:

selecting a combination of information whose usage frequency is equal to or higher than a predetermined number, out of a combination of information including the predetermined capabilities as a setting and a combination of information not including the predetermined capabilities as a setting, if it is determined that the number of the predetermined capabilities that have been implemented, is equal to or higher than the predetermined ratio; and transmitting the combination of information to the image processing apparatus serving as the distribution destination.

8. A non-transitory computer-readable storage medium storing a computer-executable process, the computer-executable process causing a computer to execute an information processing method for use in an information processing apparatus, the information processing method comprising:

receiving information indicating capability of each image forming apparatus from a plurality of image forming apparatuses via a network;

determining, by using information received, whether a number of predetermined capabilities of an image processing apparatus that have been implemented, is equal to or higher than a predetermined ratio to the number of a plurality of image processing apparatuses;

selecting a combination of information whose usage frequency is equal to or higher than a predetermined number, out of the plurality of combinations of information including the predetermined capabilities as a setting; and transmitting, the selected combination of information to an image processing apparatus serving as a distribution destination, if it is determined that the number of the predetermined capabilities of the image processing apparatus that have been implemented, is less than the predetermined ratio.

* * * * *